G. HAYES.
Skylight.

No. 8,674. Reissued April 15, 1879.

Witnesses.
George A. Hayes
Elizabeth Hopkins

Inventor.
George Hayes.

THE NORRIS PETERS CO., PHOTO-LITHO., WASHINGTON, D. C.

UNITED STATES PATENT OFFICE.

GEORGE HAYES, OF NEW YORK, N. Y.

IMPROVEMENT IN SKYLIGHTS.

Specification forming part of Letters Patent No. 100,143, dated February 22, 1870; Reissue No. 5,693, dated December 23, 1873; Reissue No. 8,674, dated April 15, 1879; application filed January 21, 1879.

*To all whom it may concern:*

Be it known that I, GEORGE HAYES, of the city, county, and State of New York, have invented certain new and useful Improvements in the Construction of Skylights, Conservatory and other Glazed Roofs or Structures, of which the following is a specification.

This invention relates to skylights, conservatory and other glazed metal roofs or structures; and consists in certain novel constructions of parts, whereby, while every provision is made for expansion and contraction without straining of the parts or breakage of the glass, lightness and strength are secured to the structure, and the latter may be put together cheaply and expeditiously, leakage is avoided, lapping of the glasses when in section dispensed with, also putty to secure them, likewise provision made for carrying off water passing any of the joints, and, by using galvanized sheet metal, paint is rendered unnecessary.

Figure 1:
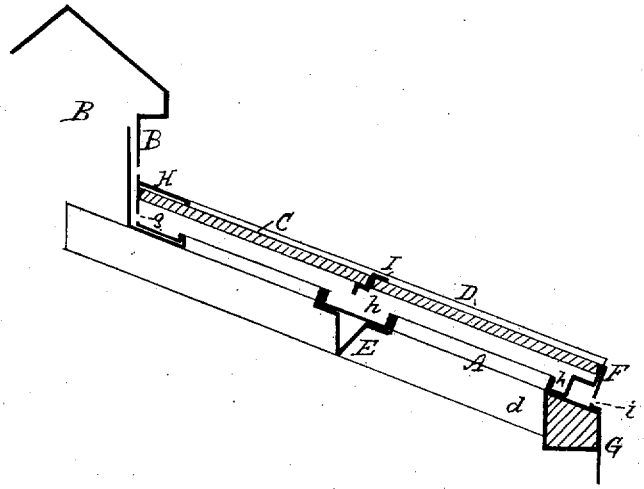
Figure 2:
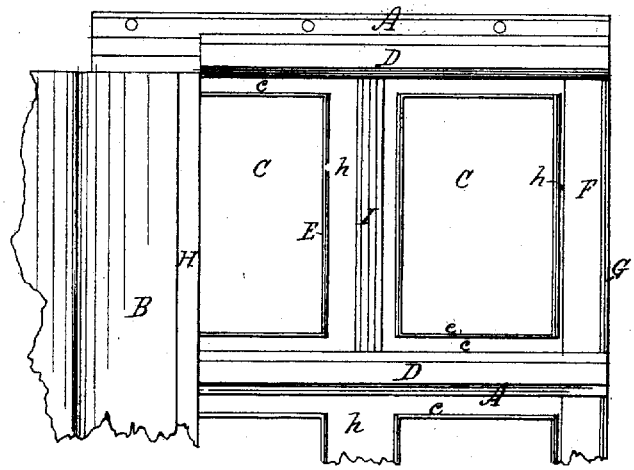
Figure 3:
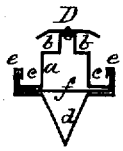
Figure 4:
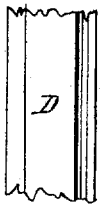
Figure 5:
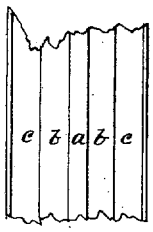
Figure 6:
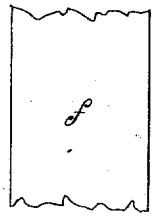

In the accompanying drawings, Figure 1 represents a vertical section of the one half or portion of a conservatory-roof constructed according to my invention; Fig. 2, a plan of the same in part; Fig. 3, a transverse section, on a larger scale, of a metallic bar, with its gutters and attachments, used in the construction of the said roof, and Figs. 4, 5, 6, and 7 plan views of details of the same.

Like letters refer to like parts.

A prominent feature of this invention is a hollow metallic bar or rafter, A, of which there may be any number in the structure, according to the size of the roof, and which, in connection with cross-beams or transoms, form the main supports of the roof, and, as applied to a conservatory-roof, run from the ventilator B to the curbing. Said hollow bars A are composed of a sheet-metal body, *a*, bent to form rabbets *b b* for support of the panes or plates of glass C along their sides or edges, and gutters *c c* for the escape of water beating or leaking into the structure. To give this hollow metallic bar or rafter A the appearance of a solid molded bar, and at the same time to stiffen or strengthen it, a lower V or other suitably shaped sheet-metal molding, *d*, may be arranged to brace the body *a* of the bar, and so that it forms a part of the latter, such sheet-metal molding *d* being bent at its upper edges to overlap and clip the upper edges of the gutters *c c*, as at *e e*; or the hollow bar A may be stiffened at the base of its body *a* by a flat metal stay-plate, *f*, the same being secured to the bar by rivets through the gutters *c c*; or both the molding *d* and stay-plate *f* may be used, the latter being arranged between the molding and base of the body *a* of the bar, and the whole being secured together by rivets passing through the gutters *c c*. The glasses C may be secured in the rabbets *b b* by means of sheet-metal caps D soldered on the top of the bar A, no putty in such case being necessary to secure the glass.

Figure 7:
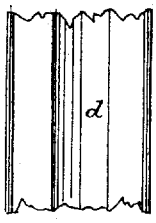

The ventilator B, of suitable construction, is arranged to sit over or into, or partially into, the highest part of the skylight, about as shown, the rafters, or part of the same, continued upward to the peak to meet the corresponding rafter on the other side, about as shown in Fig. 7, and made to communicate, by apertures *g*, as desired, with gutters *c c* of the bars A, to carry off drip, &c.

E E are the cross-beams or transoms, also formed hollow and of sheet metal, and provided on top with gutters *h*, connecting at their ends with main gutters *c c*.

The glasses C are arranged so that, instead of lapping the one over the other, they form butted joints, and they have associated with them, as a necessary element, under cross-gutters, *h*, which receive any leakage or water of condensation and conduct the same to the main gutters, *c c*. Said glasses are restrained from sliding out of place by the lowermost of them entering within and being stopped or supported by the rabbeted portion of a foot-strip, F, which projects upward from what is termed the "frame" G of the roof or skylight; which portion G or frame lies over the usual wood or other curbing when the roof is fitted to its place on the building.

H is a strip of metal arranged to project from the ridge ventilator over the glass at its top to prevent leakage past the upper edge of the top glasses.

I is a metal clip, constructed to form a lap under and over the adjacent edges of the glasses in a crosswise direction to the base A, and extending so that they are covered at their ends by the cap-plates D. These clips aid in causing any water which may not pass over them to the foot of the roof, but which leaks through the joints of the glasses, to find its way into the cross-gutters *h*.

By the construction here shown and described any water formed by condensation or by leakage past any of the joints is conducted by the main and cross gutters to the foot of the roof or skylight, and finally delivered by or through outlets *i* in the base of the foot-strip F free from all liability of air or wind entering the structure by the outlets provided for carrying off the water.

What I claim as new, and desire to secure by Letters Patent of the United States, is—

1. The metallic bar or rafter A, formed of a hollow sheet-metal body, *a*, constructed and arranged to form rabbets *b b* for the glasses and gutters *c c*, substantially as specified.

2. A stay-plate, *f*, in combination with a hollow sheet-metal bar or rafter, A, composed of a main body, *a*, rabbets *b b* for the glasses, and gutters *c c*, substantially as described.

3. The hollow molding *d*, in combination with the hollow sheet-metal bar or rafter having body *a*, rabbets *b b*, and gutters *c c*, substantially as specified.

4. In combination with a skylight-bar having ridge, ledges, and gutters formed of one piece of folded sheet metal, essentially as shown, an under cap or molding properly secured thereto beneath the same, substantially as and for the purpose described and set forth.

5. The metallic rafter A, formed of a hollow sheet-metal body, *a*, stay-plate *f*, and molding *d*, fitted together and arranged to form rabbets *b b* for the glasses, and gutters *c c*, essentially as specified.

6. The combination of cap-plate D with hollow sheet-metal bars or rafters having rabbets and gutters, substantially as shown.

7. In combination with sloping or descending gutters *c c* of the bars or rafters of a metallic skylight, one or more transverse intermediate gutters, *h*, located between base of skylight and ridge to catch leakage or drip resulting from a joining of the glasses above, substantially as shown and described.

8. In combination with the sloping or descending gutters *c c* of the bars or rafters of a metallic skylight, a cross or transverse gutter, *h*, located at or against the ridge of skylight, for the purpose of catching possible leakage at the joining of the glass plates with said ridge, essentially as shown and described.

9. The combination of cross-gutter *h* with glasses C, arranged to form a butted joint, substantially as shown and described.

10. In a metallic skylight, the combination, with glasses, of one or more clips or cross-bars, I, forming a rabbet or means of support for the upper sheet of glass when in sections, to obviate the necessity of lapping the joint, thereby constituting a butt-joint, substantially as shown and described.

11. In a skylight, the combination of plates of glass in sections with suitable clips at the joining, in such manner that a butt-joint will be formed and the surfaces of the glass be uniform and the edges rest level on the proper rabbets, substantially as described and set forth.

12. In a metallic skylight, a base gutter, located beyond or outside the inner line of curb, and in combination with the gutters of rafters, so as to receive the discharge therefrom and convey it to proper outlets, substantially as shown and described.

13. In combination with the sloping or descending gutters *c c* of rafters or bars A *a*, base-gutter *h*, arranged in and forming a part of the base-frame of a skylight, essentially as shown and described.

14. In combination with glass-supporting bars or rafters of a metallic skylight, a stop, F, arranged and formed so as to secure the ends of glass plates and provide an aperture therein for escape of water, substantially as described.

15. The foot-strip F, arranged to project upward from the frame G, for the lowermost glasses to rest against, in combination with main gutters *c c*, base cross-gutter *h*, and outlets *i*, substantially as specified.

GEORGE HAYES.

In presence of—
GEORGE A. HAYES,
ELIZABETH HOPKINS.